Feb. 17, 1948.  K. S. WRISLEY  2,436,029
SEPARATOR
Filed Feb. 24, 1944
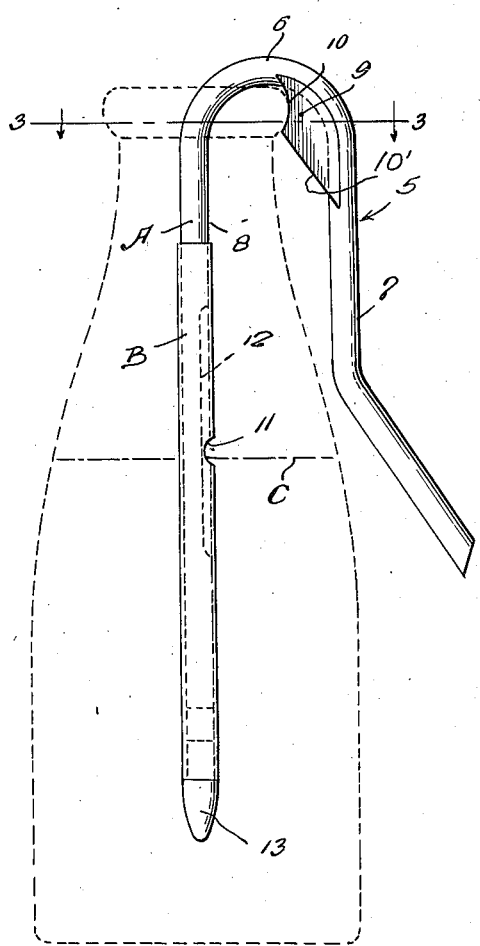
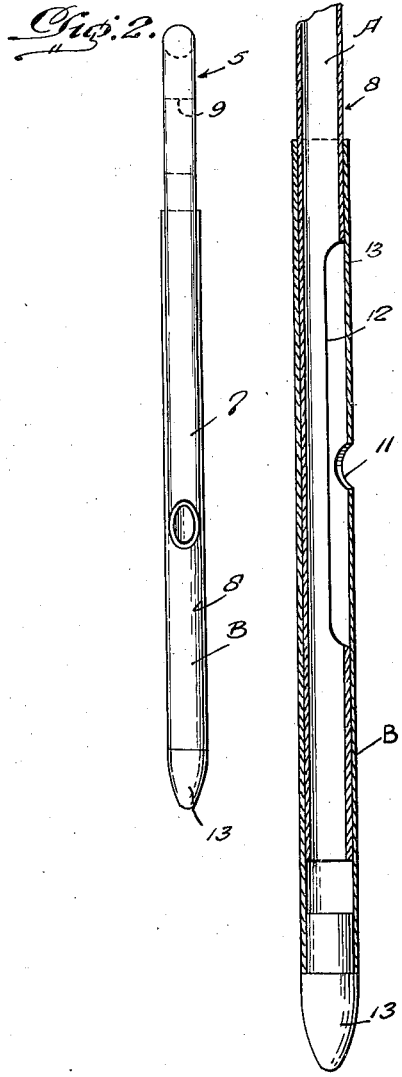
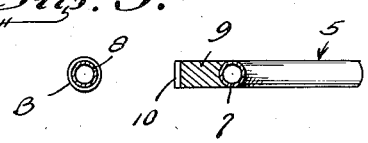
Inventor
Kenneth S. Wrisley,
By McMorrow and Berman
Attorneys Patented Feb. 17, 1948

2,436,029

UNITED STATES PATENT OFFICE 2,436,029

SEPARATOR

Kenneth S. Wrisley, Cuba, N. Y.

Application February 24, 1944, Serial No. 523,758

2 Claims. (Cl. 137—20)

This invention relates to a separator for removing a liquid of one density from a liquid of another density, such as cream from milk within a conventional type of container or bottle, and has for the primary object the provision of a device operating on the self-starting siphon principle whereby cream may be drawn off of milk without unduly disturbing the latter and which will be self-sustaining in an operating position on a milk bottle and may be conveniently adjusted in accordance with the amount of cream to be removed from the milk which will permit the device to be used in conjunction with bottles of different sizes containing milk and cream.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a separator constructed in accordance with my invention and showing the separator associated with a milk bottle.

Figure 2 is an edge elevation illustrating the separator.

Figure 3 is a sectional view taken on the line 3—3 of Figure 1.

Figure 4 is a fragmentary vertical sectional view illustrating the telescopic construction of the separator.

Referring in detail to the drawings, the numeral 5 indicates in entirety a separator consisting of a tube which is of substantially U-shape providing an arcuately curved connecting portion 6 and leg portions 7 and 8. The leg portion 8 is of a greater length than the leg portion 7 and the latter has its free end portion laterally offset, as shown in Figure 1, so that when the separator 5 is arranged in a bottle, as shown in Figure 1, the free end of the leg portion 7 will be spaced a considerable distance away from the exterior wall of the bottle (shown in dotted lines) to permit a container (not shown) to be conveniently arranged thereunder for catching the cream as it flows from the leg portion 7.

Formed on the leg portion 7 and a part of the connecting portion 6 is a supporting member 9 in the form of a block, the thickness of which is substantially equal to the external diameter of the tube and is provided with an arcuately curved seat 10 to engage with the bead of the neck of the milk bottle as shown in Figure 1 for supporting the separator on the bottle with the leg portion 8 extending downwardly in the milk bottle and substantially centrally thereof, while the leg portion 7 is arranged exteriorly of the bottle and spaced throughout its length from the exterior wall of the bottle.

The leg portion 8 of the separator consists of telescopic sections A and B. The section B has a sliding fit with the section A and is arranged exteriorly of the latter-named section and is provided with a port 11 while the section A is provided with an elongated slot 12. The port 11 communicates with the slot 12. The slot and port will permit of the section B being adjusted endwise of the section A with the port 11 remaining in communication with the interior of the section A by way of the slot 12. This will permit the port 11 to be conveniently adjusted to the lowest level of the cream or where the latter meets with the milk, as indicated by the dotted lines C in Figure 1.

The section B has its free end closed by a removable plug 13. The plug being removable will allow the tube of the separator to be conveniently cleansed by running a solution entirely through the tube from end to end thereof and, if desired, a suitable wire or other cleaning element may also be obviously passed entirely through the tube of the separator.

From the foregoing description taken in connection with the accompanying drawings, it will be seen that a separator operating on the siphon principle has been provided which when applied to a bottle will position one leg portion of the separator centrally of the bottle and within the latter, while the other leg portion will be supported exteriorly of the bottle and spaced from the walls of the bottle. Further, it will be seen that the port 11 which takes in the cream from the milk bottle can be adjusted upwardly and downwardly in accordance with the amount of cream in the bottle still remaining in communication with the section A of the tube. This arrangement will permit the separator to be successfully employed in connection with bottles of different sizes containing different amounts of cream and milk.

The operation of the separator device of the present invention starts automatically and immediately as the device is immersed in the liquid contents of the bottle or container substantially the same as in conventional siphon devices formed and operating on the same general principle.

Further it is to be noted that (see Figure 1)

the supporting member 9 is provided with an inclined face 10', the purpose of which is to contact the mouth of the bottle during the initial insertion of the device in the bottle and will act to guide the device to assume the position of the seat 10 engaging the mouth of the bottle or the usual bead thereof which locates the leg portion 8 centrally of the bottle with the leg portion 7 positioned exteriorly of the bottle and spaced therefrom. The device thus engaged with the bottle will be prevented from moving out of the stated position or relation with the bottle and consequently locate the port 11 at a proper position of taking off the cream from the milk.

While this device has been specifically described for the purpose of separating cream from milk, it also may be employed for separating other liquids wherein the density of the liquids within a container are different from one another.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a separator of the character described, a tube of substantially U-shape providing a pair of spaced apart leg portions, one to enter and the other to be disposed outside of a container and a connecting portion joining said leg portions, a supporting member formed on the connecting portion and adjacent part of the outer leg portion and comprising a block having a width thickness substantially equal to the external diameter of the attached tube portion and provided with an inclined bottom and an arcuately curved lateral seat to engage an outer annular bead of the neck of a milk bottle or like container for positioning said outer leg portion exteriorly of and spaced from the container with the other leg portion extending downwardly in the container and centrally thereof, said latter-named leg portion including telescopic tubular sections with the inner section provided with an elongated longitudinal slot and the outer section provided with a restricted port communicating with said slot, whereby, upon relative longitudinal adjustment of said telescopic tube sections, the length of the inner leg of the device is varied and the relative position of the restricted opening is changeable for the removal of different quantities of liquid from the container to which the device is applied.

2. In a separator of the character described, a tube of substantially U-shape providing a pair of spaced-apart leg portions, one to enter and the other to be disposed outside of a container and a connecting portion joining said leg portions, said leg portion for entering the container including telescopic tubular sections, one of which is movable longitudinally of the other, with the other section provided with an elongated longitudinal slot and the one section provided with a restricted port communicating with said slot, whereby, upon relative longitudinal movement of said sections, the length of the inner leg of the device is varied and the relative position of the port is changed for the removal of different quantities of liquid from the container to which said device is applied.

KENNETH S. WRISLEY.

REFERENCES CITED

The following references are of record in the file of this patent:

UNITED STATES PATENTS

| Number | Name | Date |
|---|---|---|
| 1,562,131 | Toll | Nov. 17, 1925 |
| 1,915,403 | Clark | June 27, 1933 |
| 2,022,927 | Simpson | Dec. 3, 1935 |
| 2,256,432 | Iverson | Sept. 16, 1941 |
| 653,899 | Boggess | July 17, 1900 |
| 682,269 | Poe | Sept. 10, 1901 |
| 1,604,465 | Marker | Oct. 26, 1926 |
| 1,690,958 | Vallez | Nov. 6, 1928 |